No. 769,964. Patented September 13, 1904.

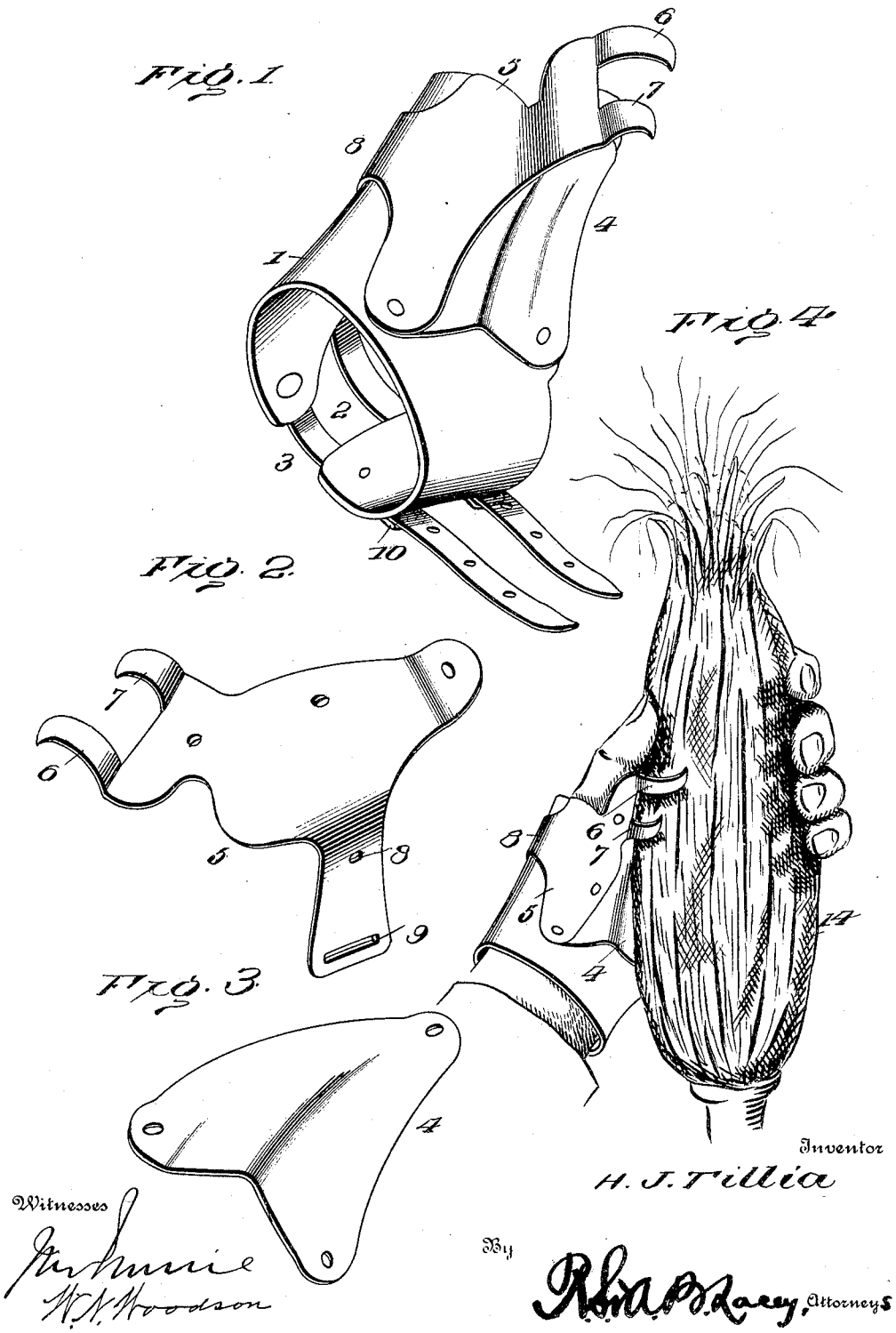

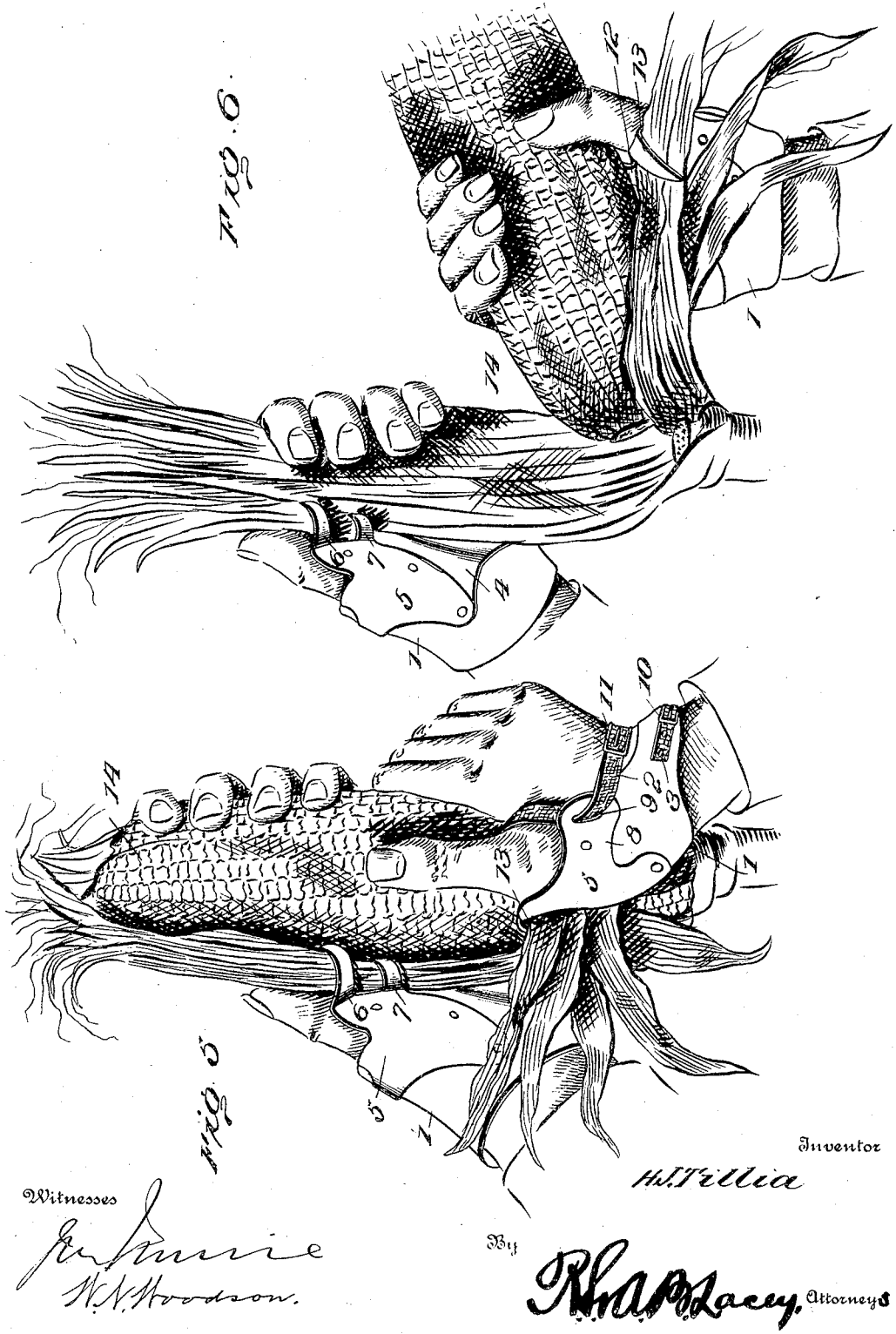

UNITED STATES PATENT OFFICE.

HENRY J. TILLIA, OF BUDA, ILLINOIS.

HUSKING IMPLEMENT.

SPECIFICATION forming part of Letters Patent No. 769,964, dated September 13, 1904.

Application filed March 24, 1904. Serial No. 199,787. (No model.)

*To all whom it may concern:*

Be it known that I, HENRY J. TILLIA, a citizen of the United States, residing at Buda, in the county of Bureau and State of Illinois, have invented certain new and useful Improvements in Husking Implements, of which the following is a specification.

This invention has relation to an implement for husking corn by hand, the purpose being to facilitate, expedite, and render the work less fatiguing and irksome and enable the ear to be freed from every particle of the enveloping sheath.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of the implement. Fig. 2 is a detail view in perspective of the plate provided with the hooks for separating the husk and holding it during the operation of removing the ear and snapping it from the stalk. Fig. 3 is a detail view of the reinforcing and protective plate. Fig. 4 is a detail view showing an ear of corn grasped in the hand to which the husking implement has been previously fitted. Fig. 5 is a view showing the husks partly stripped from the ear, the opposite hand being employed in the operation and equipped with a mating hook. Fig. 6 is a view showing the final operation of clearing the ear from the husk, the ear being snapped from the stalk.

Corresponding and like parts are referred to in the following description and indicated in all the views of the drawings by the same reference characters.

The implement is constructed in rights and lefts, according to the hand upon which it is to be worn.

The device comprises a wrist-strap 1, securing-straps 2 and 3, reinforcing-plate 4, and plate 5, provided with hooks 6 and 7. The wrist-strap is widened near one end to cover the portion of the hand at the base of the thumb, and the plates 4 and 5 are secured to this widened portion. The reinforcing-plate 4 is approximately of triangular form and is bent intermediate of opposite edges, so as to conform approximately to the part of the hand against which it is fitted when the implement is worn. The reinforcing-plate holds the widened part of the wrist-strap extended and likewise receives the wear incident to the use of the implement.

The plate 5 is formed with an extension 8, which is bent to extend around the hand at the base of the thumb. A slot 9 is formed in the end portion of the extension 8 and is adapted to receive the thumb-strap 2. The hooks 6 and 7 are arranged so as to come upon the inner side of the hand and about in line with the thumb when the hand is extended in a natural position. The hook 6 is somewhat longer than the hook 7, this being necessary by reason of the relative position of the two hooks, so as to enable them to engage with and penetrate the husk or sheath preliminary to stripping the same from the ear. The terminal portions of the husks 6 and 7 point toward the hand, whereas the body portion of the hooks curves away from the hand, thereby giving the proper set to the ends of the hooks as well as providing a hollow for reception of the edge portion of the husks during the process of stripping the same from the ear.

The strap 3 is fastened at one end to a corner of the wrist-strap, and after passing around the back of the wrist it engages with a buckle 10 at the opposite corner of the wrist-strap. The strap 2 is fastened to the inner corner of the widened portion of the wrist-strap and is passed around the thumb, thence through the slot 9 of extension 8, and is engaged by a buckle 11 at the opposite corner of the wrist-strap.

An implement constructed substantially as herein disclosed is adapted to be worn upon the left hand of the operator, whereas if the operator is left-handed a similar implement will be provided having the parts oppositely arranged.

An implement somewhat similar in construction is provided for the right hand or the left hand, as the case may be, and this second implement is called the "mating hook" and in all respects is similar to the implement herein described, with the exception that the hooks 6 and 7 are replaced by extensions 12 and 13, the extension 12 projecting upward about in the plane of the plate 5 and the extension 13 being bent downward, so as to engage over the husks and effect complete separation thereof from the ear, as indicated most clearly in Fig. 3.

The husking implement and the mating hook being secured to opposite hands of the operator, the operation of husking is effected in the following manner and about as shown in Figs. 4, 5, and 6: The ear of corn 14 is grasped in the hand provided with the implement about as shown in Fig. 4, the hooks 6 and 7 penetrating the husk without injuring the grain, thereby causing the husks to part sufficiently on a line corresponding with the penetrating ends of the hooks 6 and 7. The opposite hand is brought in contact with the ear. Thus the bent portion 13 of the mating hook is engaged over the edge of the husk, and the hand is moved so as to expose the ear about as shown in Fig. 5, the ear being grasped by the right hand and bent forward and downward, so as to break or snap it from the stalk about as indicated in Fig. 6, the hook 13 preventing the husks flying back toward the left hand, thereby facilitating the operation and insuring complete separation of the husks.

While the mating hook disclosed is preferred, it is to be understood that any well-known form of husking implement capable of coöperation with that forming the subject of this invention may be used.

Having thus described the invention, what is claimed as new is—

1. A husking implement comprising a plate provided with means for attachment to the hand to cover the base portion of the thumb and having spaced hooks at its inner edge projected therefrom about at a right angle to the length of the thumb when extended, the outer hook being longer than the inner hook and both hooks being curved in their length away from the hand so that their hollow side faces the palm, substantially as set forth.

2. In a husking implement, the combination of a wrist-strap having an end portion widened to cover the part of the hand at the base of the thumb, a reinforcing-plate covering the widened portion of the wrist-strap, and a second plate secured to the wrist-strap and provided with a curved portion to extend around the hand at the base of the thumb and with companion hooks about in longitudinal alinement with the thumb, the outer hook being the longer, and both hooks in their length curving away from the palm of the hand, substantially as set forth.

3. In a husking implement, the combination of a wrist-strap, a plate attached to the wrist-strap to cover the part of the hand at the base of the thumb and provided with hooks about in longitudinal alinement with the thumb and having an extension to curve around the thumb, said extension having a slot near its outer end, a thumb-strap fastened at one end to the wrist-strap and adapted to pass around the thumb and through the slot of said extension and to make connection with the loose end of the wrist-strap, and a reinforcing-plate for the inner portion of the wrist-strap and attached thereto and to the hook-plate, substantially as described.

In testimony whereof I affix my signature in presence of two witnesses.

HENRY J. TILLIA. [L. S.]

Witnesses:
A. D. BOAT,
V. R. MOKLER.